(12) United States Patent
Venkataraman et al.

(10) Patent No.: US 12,093,825 B2
(45) Date of Patent: *Sep. 17, 2024

(54) ELECTRONIC SYSTEM FOR DATA PROCESSING BY A SELF-CORRECTING, DEEP NEURAL NETWORK INTEGRATED WITHIN A MEMORY RESOURCE

(71) Applicant: BANK OF AMERICA CORPORATION, Charlotte, NC (US)

(72) Inventors: Ananthakrishnan Venkataraman, Irving, TX (US); Vidya Srikanth, Sunnyvale, CA (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/384,495

(22) Filed: Oct. 27, 2023

(65) Prior Publication Data
US 2024/0054344 A1 Feb. 15, 2024

Related U.S. Application Data

(63) Continuation of application No. 16/997,456, filed on Aug. 19, 2020, now Pat. No. 11,836,618.

(51) Int. Cl.
*G06N 3/08* (2023.01)
*G06F 16/23* (2019.01)
*G06F 16/245* (2019.01)
*G06N 3/044* (2023.01)

(52) U.S. Cl.
CPC .......... *G06N 3/08* (2013.01); *G06F 16/2379* (2019.01); *G06F 16/245* (2019.01); *G06N 3/044* (2023.01)

(58) Field of Classification Search
CPC ........................................ G06N 3/08
USPC ............................................ 706/25
See application file for complete search history.

(56) References Cited

U.S. PATENT DOCUMENTS

| 7,403,904 | B2* | 7/2008 | Abe | G06Q 30/0234 706/14 |
| 8,655,695 | B1* | 2/2014 | Qu | G06Q 30/0251 705/7.29 |
| 9,456,086 | B1* | 9/2016 | Wu | H04M 3/5233 |
| 11,012,511 | B1* | 5/2021 | Sridharan | H04L 67/10 |
| 11,216,725 | B2* | 1/2022 | Bouton | G06F 16/951 |
| 11,531,578 | B1* | 12/2022 | Heaton | G06F 11/1476 |
| 2014/0137071 | A1* | 5/2014 | Wadhwani | G06F 8/70 717/101 |
| 2014/0298039 | A1* | 10/2014 | Pandya | G06F 3/0638 713/190 |
| 2016/0162906 | A1* | 6/2016 | Irby | G06Q 30/018 705/317 |
| 2016/0371617 | A1* | 12/2016 | Mullaney | G06Q 10/0635 |
| 2017/0330102 | A1* | 11/2017 | Brush | G16H 10/60 |
| 2019/0156947 | A1* | 5/2019 | Nakamura | G16H 50/20 |

(Continued)

*Primary Examiner* — Reza Nabi
(74) *Attorney, Agent, or Firm* — Moore & Van Allen PLLC; Nicholas C. Russell

(57) ABSTRACT

Embodiments of the invention are directed to a system, method, and computer program product for processing data analytics within memory. The system first receives a request for data associated with a database. The system utilizes a feature catalog and a deep learning neural network to determine the data that comprises the one or more desired features. The system can also provide the requested data to a computing device.

18 Claims, 6 Drawing Sheets

(56) References Cited

U.S. PATENT DOCUMENTS

| | | | |
|---|---|---|---|
| 2020/0034685 A1* | 1/2020 | Kempf | G06N 3/084 |
| 2020/0167281 A1* | 5/2020 | Flores | H04L 67/06 |
| 2022/0058475 A1* | 2/2022 | Venkataraman | G06N 3/08 |
| 2022/0351004 A1* | 11/2022 | Kanter | G06F 18/285 |
| 2022/0414470 A1* | 12/2022 | Nojavanasghari | G06N 3/0985 |
| 2023/0108177 A1* | 4/2023 | Li | G06N 3/0985 706/12 |
| 2023/0252301 A1* | 8/2023 | Volkovs | G06N 3/045 712/7 |

* cited by examiner

ELECTRONIC SYSTEM FOR DATA PROCESSING BY A SELF-CORRECTING, DEEP NEURAL NETWORK INTEGRATED WITHIN A MEMORY RESOURCE

CROSS-REFERENCE TO RELATED APPLICATIONS

This application is a continuation application of and claims priority to U.S. patent application Ser. No. 16/997,456 filed on Aug. 19, 2020, and of the same title; the contents of which are also incorporated herein by reference.

FIELD OF THE INVENTION

The present invention is directed to, in general, a novel, proactive approach for processing data analytics. Specifically, embodiments of the present invention are directed to processing data analytics within a memory resource.

BACKGROUND

When managing large amounts of data (e.g., assessment intelligence operations), the data may be distributed across multiple storage facilities in multiple locations to spread the load of the data storage, as well as to provide redundancy in case of a loss of data at one of the multiple storage facilities. To access the data spread across the multiple locations, a central data management console may be utilized to orchestrate distributed data pulls, as well as manage how the data is stored. However, by utilizing the central data management console, additional problems can arise as the size of the data increases. For example, latency and performance related issues are likely to increase as the amount of data increases, as well as a higher potential degree of infrastructure bottleneck issues as the data is distributed across multiple storage facilities. Historically, to address these issues, a cache in system memory can be used to reduce latency, as well as reduce the potential of infrastructure issues by co-locating the cache with the central data management console. However, as the amount of data stored increases, the size of the cache also increases, which can lead to increased computational resources associated with the cache and negates the benefits of using the cache in the first place. Accordingly, there is a need for smart systems and deep learning methods that improve the functioning of memory, such as a cache, in order to improve performance and automatically optimize data operations when dealing with large amounts of data.

The previous discussion of the background to the invention is provided for illustrative purposes only and is not an acknowledgement or admission that any of the material referred to is or was part of the common general knowledge at the priority date of the application.

SUMMARY

In one aspect, the present disclosure is directed to a system for processing data analytics within memory. In one embodiment, the system can comprise at least one memory device; at least one communication device connected to a communications network; at least one processing device operatively coupled to the at least one memory device; and a module stored in the at least one memory device comprising executable instructions. The executable instructions, that when executed by the at least one processing device, can cause the at least one processing device to receive, from a computing device by a cache device, a first request for data associated with a database. The request can indicate one or more desired features of the data. The executable instructions can also cause the at least one processing device to search a feature catalog for the data that comprises the one or more desired features. The feature catalog can comprise data features associated with a plurality of requests that were previously processed, and each of the plurality of requests can comprise respective one or more desired features of the data. The executable instructions can further cause the at least one processing device to determine, based on the search of the feature catalog, whether the feature catalog comprises the requested data. The feature catalog can be updated in real-time utilizing a deep learning neural network comprising a plurality of Long Short-Term Memory (LSTM) cells configured to update the feature catalog based on a respective relevancy of the respective one or more desired features of the data. If the feature catalog comprises the requested data, the executable instructions can cause the at least one processing device to transmit the requested data to the computing device. If the feature catalog does not comprise the requested data, the executable instructions can cause the at least one processing device to transmit a second request for the data comprising the one or more desired features to the database.

In another embodiment, and in combination with any of the previous embodiments, the feature catalog comprises a multi-dimensional feature attribute matrix that indicates the one or more features in a first dimension of the multi-dimensional matrix, and the multi-dimensional matrix indicates the additional data attributes associated with the one or more features in a second, third, and extra dimension of the multi-dimensional matrix.

In another embodiment, and in combination with any of the previous embodiments, the deep learning neural network comprises a multi-layer neural network. Each of the plurality of LSTM cells can comprise at least one of a forget gate, an input gate, a vector gate, and an output gate. Each of the plurality of LSTM cells can output a respective weighted output that indicates a relevancy of a data input based on the one or more desired features.

In another embodiment, and in combination with any of the previous embodiments, the executable instructions that cause the at least one processing device to transmit the second request for the data comprising the one or more desired features to the database further cause the processing device to: receive, by the database, the second request for the data; determine, by the database, that the database does not comprise the requested data; transmit, by the database to the collection device, a first communication that indicates that the database does not comprise the requested data; in response to receiving the first communication, collect, by the collection device, data from the external data resource; transmit, by the collection device to the database, the collected data; determine, by the database, that the collected data comprises the requested data; and transmit, to the cache device via a messaging device, the requested data.

In another embodiment, and in combination with any of the previous embodiments, the executable instructions that cause the at least one processing device to transmit the requested data further cause the processing device to: determine, based on one or more pointers associated with the feature catalog, one or more locations of the requested data within memory associated with the cache device; retrieve, based the one or more locations of the requested data within the memory, the requested data from the memory; and transmit the retrieved data to the computing device.

In another embodiment, and in combination with any of the previous embodiments, the executable instructions that cause the at least one processing device to transmit the second request for the data comprising the one or more desired features to the database further cause the processing device to: receive, by the database, the second request for the data; determine, by the database, that the database comprises the requested data; transmit, by the database to a messaging device, a communication that indicates the requested data; and receive, by the cache device from the messaging device, the requested data.

In another embodiment, and in combination with any of the previous embodiments, the executable instructions that cause the at least one processing device to transmit the second request for the data comprising the one or more desired features to the database further cause the processing device to: receive, by the database, the second request for the data; determine, by the database, that the database does not comprise the requested data; transmit, by the database to a messaging device, a first communication that indicates that the database does not comprise the requested data; receive, by the cache device from the messaging device, a second communication that indicates that the database does not comprise the requested data; and in response to receiving the second communication, transmit, to the computing device, a third communication that indicates that the requested data could not be determined.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
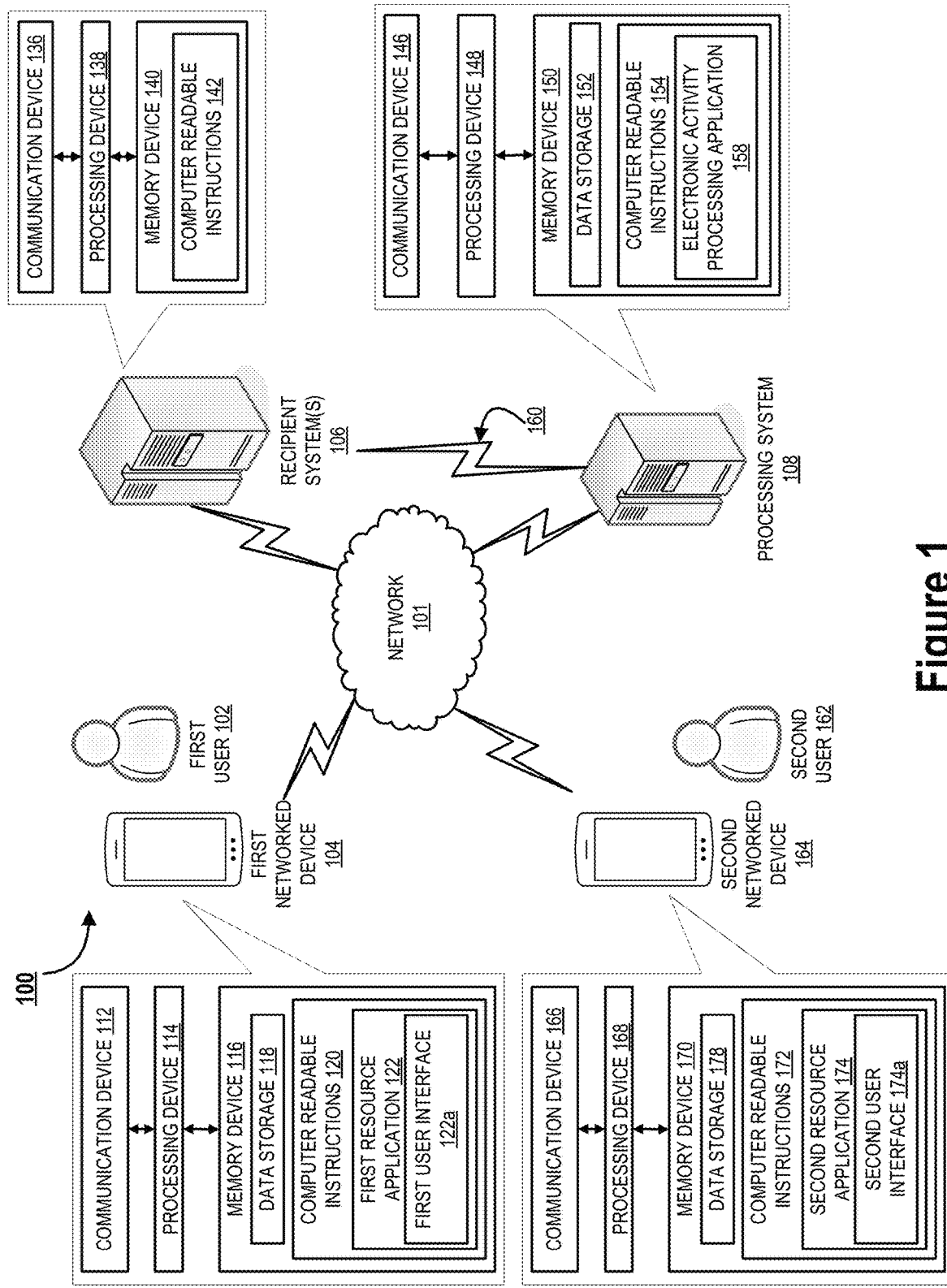
Figure 2:
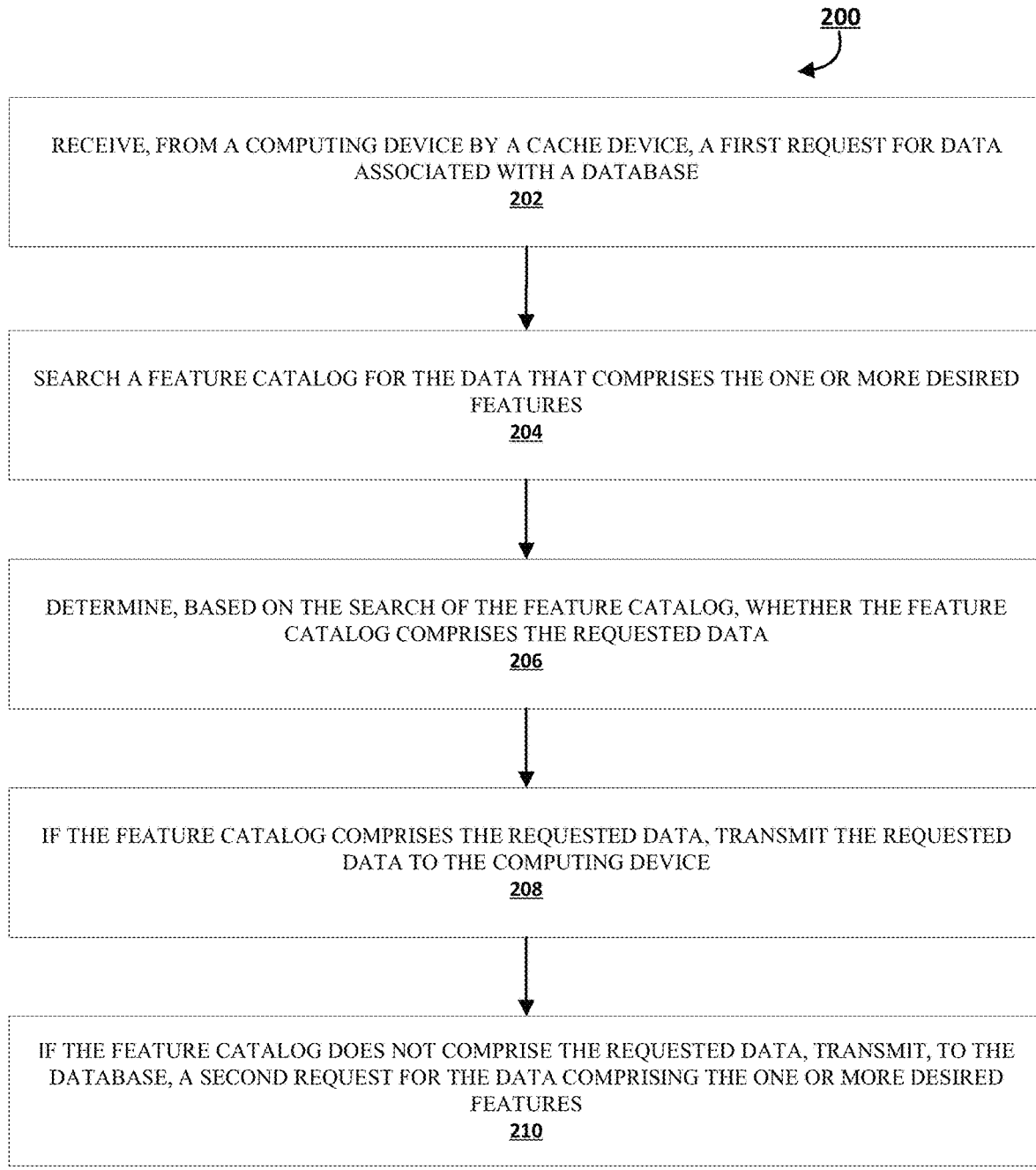
Figure 3:
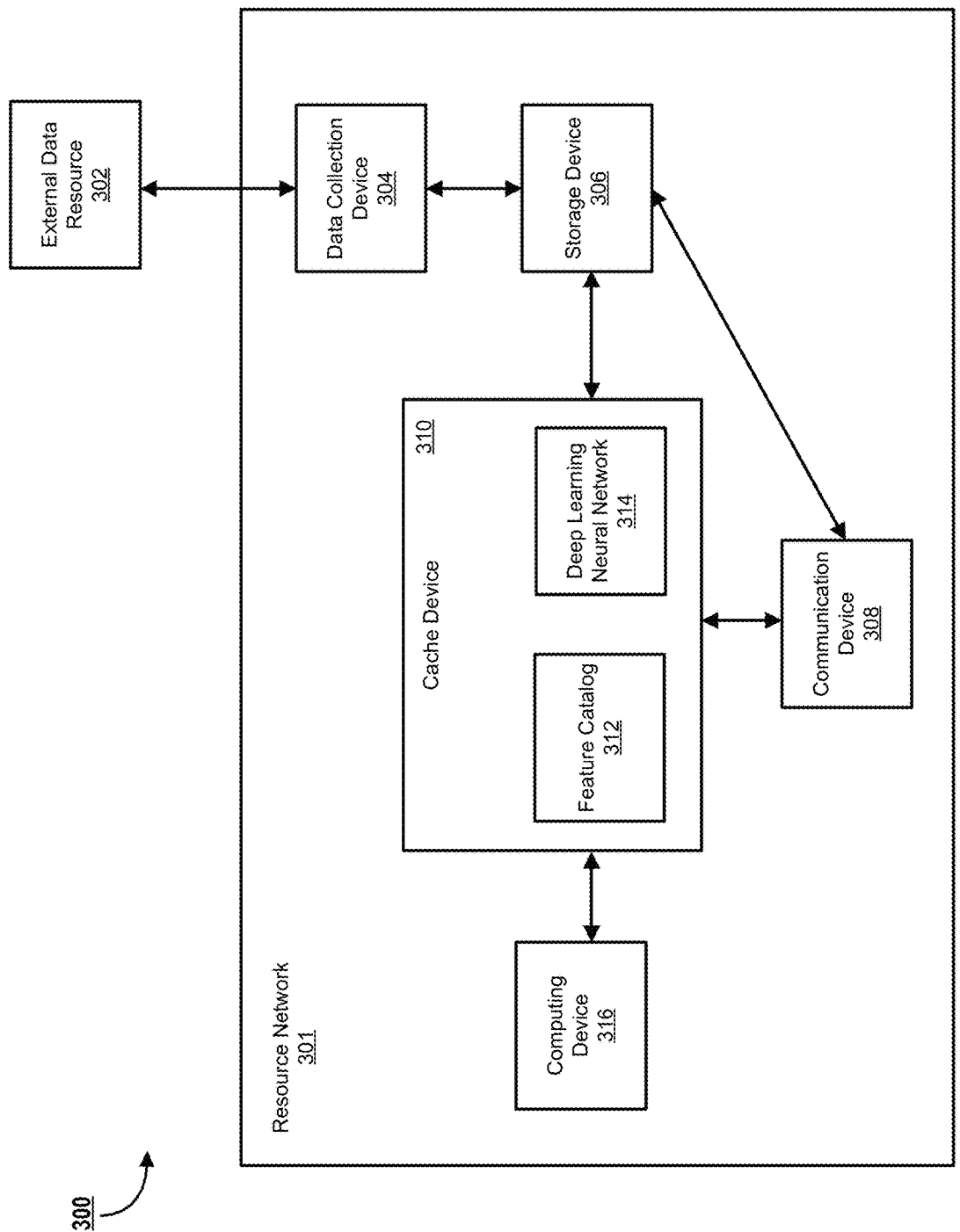
Figure 4:
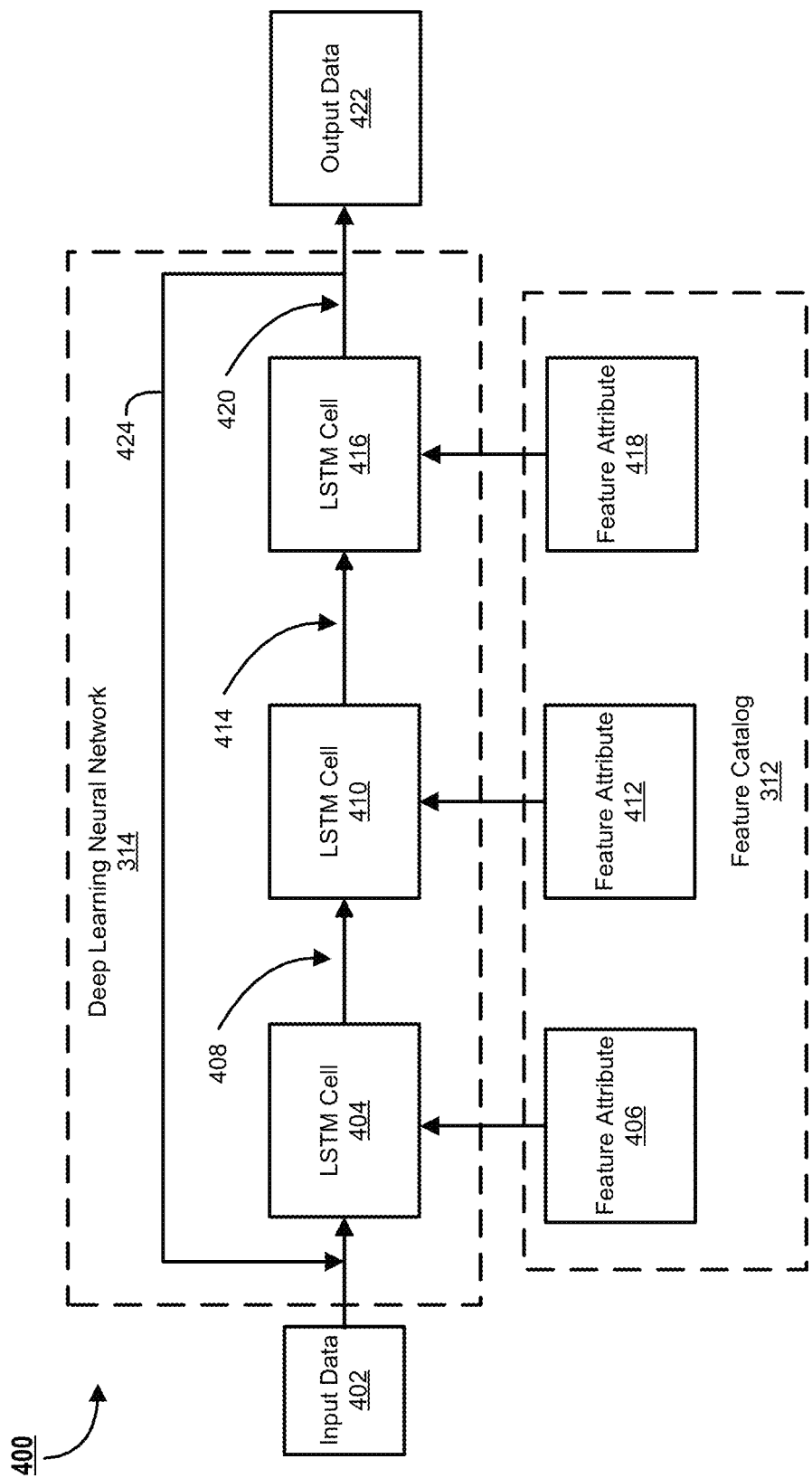
Figure 5:
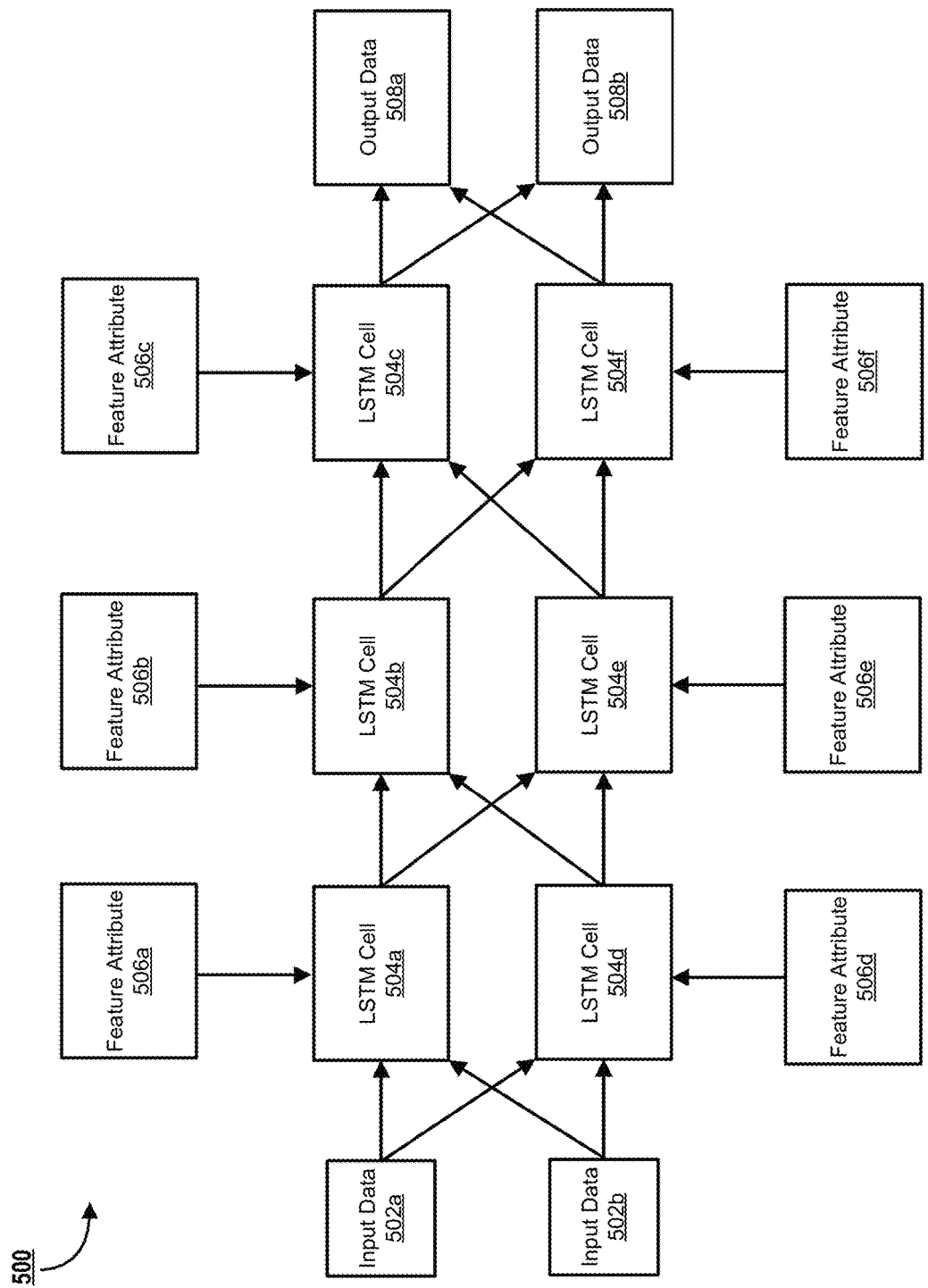
Figure 6:
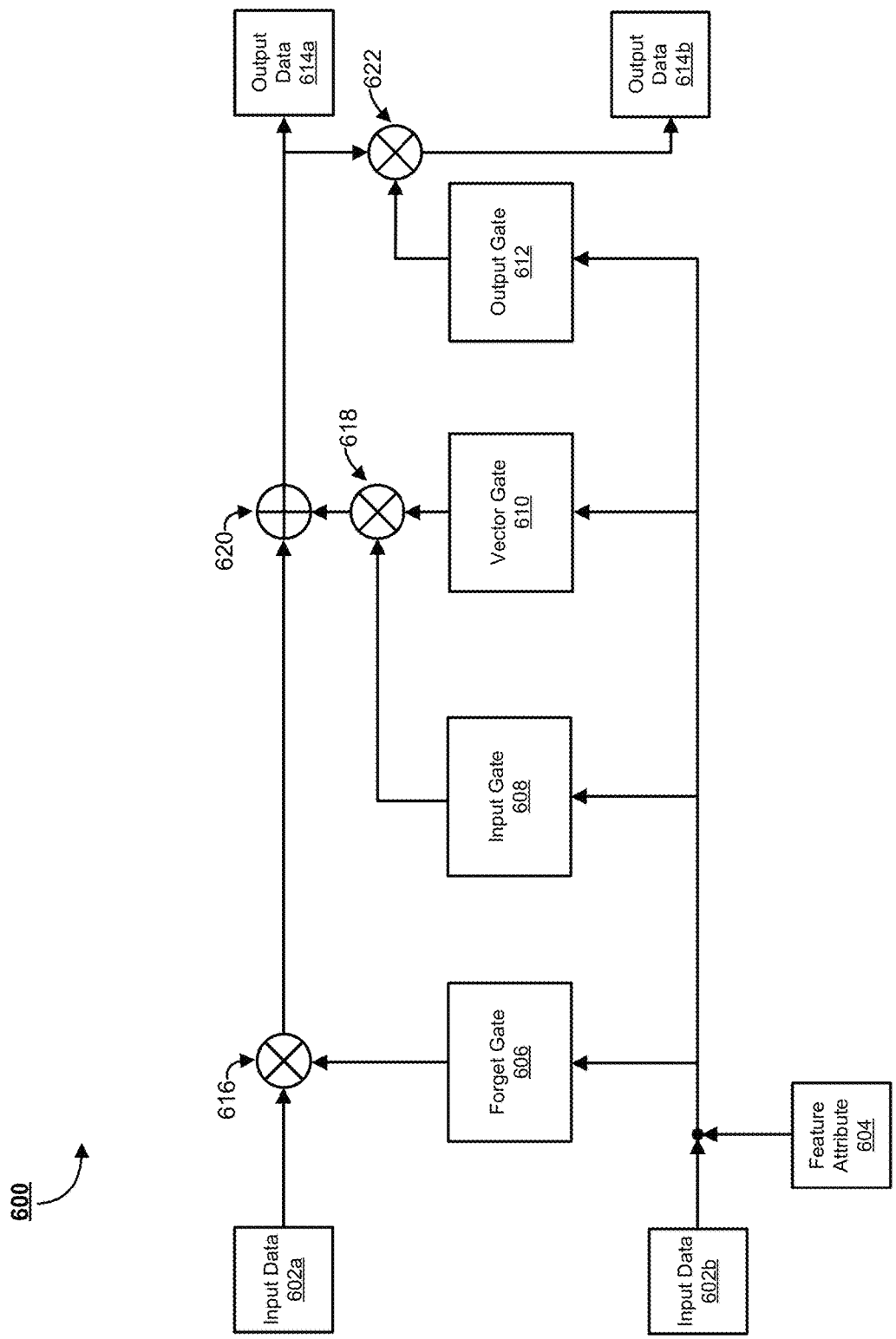

Having thus described embodiments of the invention in general terms, reference will now be made the accompanying drawings, wherein:

FIG. 1 illustrates an electronic activity processing system and environment;

FIG. 2 illustrates a flowchart of an exemplary method;

FIG. 3 illustrates an exemplary system for processing data analytics within memory;

FIG. 4 illustrates an exemplary system for processing data analytics within memory;

FIG. 5 illustrates an exemplary system comprising a multi-layer neural network; and FIG. 6 illustrates an exemplary long short-term memory cell.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

In some embodiments, an "entity" refers to an organization, a company, a group, an institute, a business or the like associated with initiating and/or performing electronic activities. Typically, the entity comprises systems, devices, applications and/or the like for initiating and/or performing electronic activities. In some embodiments, the entity initiates and/or performs electronic activities in response to receiving instructions from an associated user. In some embodiments, an "entity" as used herein may be a financial institution. For the purposes of this invention, a "financial institution" may be defined as any organization, entity, or the like in the business of moving, investing, or lending money, dealing in financial instruments, or providing financial services. This may include commercial banks, thrifts, federal and state savings banks, savings and loan associations, credit unions, investment companies, insurance companies and the like. In some embodiments, the entity may allow a user to establish an account with the entity. An "account" may be the relationship that the user has with the entity. Examples of accounts include a deposit account, such as a transactional account (e.g., a banking account), a savings account, an investment account, a money market account, a time deposit, a demand deposit, a pre-paid account, a credit account, a non-monetary user account that includes only personal information associated with the user, or the like. The account is associated with and/or maintained by an entity. In other embodiments, an "entity" may not be a financial institution. Examples for non-financial entities include cloud computing systems, database systems, block chain systems for data processing, and the like.

Unless specifically limited by the context, an "electronic activity", "user activity", "transaction" or "activity" refers to activities associated with electronic resources, such as the user's resources. In some embodiments, the electronic activity refers to resource transfers between resources, e.g., a transfer of a resource value from a first resource and a second resource. For example, the electronic activity may refer to transmission of resource value comprising predetermined data (e.g. files, text, images, and the like) from a first resource (e.g., a user device, a database, a server, a cloud storage system, and the like) to a second resource (e.g., another device, database, and the like). Typically, a first system (e.g., a user device or a networked device), for example, based on receiving instructions from a user, transmits activity parameters (e.g., location of the file, time of transmission, unique identifier of the source resource system, certificates of the target resource system, authentication information, and the like) to a recipient system (e.g., a system associated with one or more of the resources, an entity system, and the like) which then performs the electronic activity (transfer of the file from the source resource system to the target resource system). As another example, in some embodiments, the electronic activity refers to transfer of a resource value comprising financial resources (e.g. a predetermined transfer amount) from a first resource (e.g., a source user account) to a second resource (e.g., another target account). Typically, a first system (e.g., a user device), for example, based on receiving instructions from a user, transmits activity parameters (e.g., the transfer amount, time and date of the transfer, unique identifiers of the source user account and the target user account, and the like) to a recipient system (e.g., a financial institution associated with the source account and/or the target account) which then performs the electronic activity (transfer of the predetermined amount from the source user account to the target account).

As such, in some embodiments, an electronic activity or a user activity may refer to a purchase of goods or services, a return of goods or services, a payment transaction, a credit transaction, or other interaction involving a user's resources (e.g., a bank account). As another example, in some embodiments, a user activity may refer to viewing account balances, modifying user information and contact information associated with an account, modifying alert/notification preferences, viewing transaction/activity history, transferring/redeeming loyalty points and the like. In some embodiments, the user activity is associated with an entity application stored on a user device, for example, a digital wallet application, a mobile/online banking application, a merchant application, a browser application, a social media application and the like. Typically, a user activity is an electronic transaction or electronic activity in which the user is employing a mobile device, computing device, or other electronic device to initiate, execute and/or complete the activity.

As used herein, a "bank account" refers to a credit account, a debit/deposit account, or the like. Although the phrase "bank account" includes the term "bank," the account need not be maintained by a bank and may, instead, be maintained by other financial institutions. For example, in the context of a financial institution, a user activity or transaction may refer to one or more of a sale of goods and/or services, an account balance inquiry, a rewards transfer, an account money transfer, opening a bank application on a user's computer or mobile device, a user accessing their e-wallet (e.g., mobile wallet) or online banking account or any other interaction involving the user and/or the user's device that is detectable by the financial institution. As further examples, a user activity may occur when an entity associated with the user is alerted via the transaction of the user's location. A user activity may occur when a user accesses a building, uses a rewards card, and/or performs an account balance query. A user activity may occur as a user's device establishes a wireless connection, such as a Wi-Fi connection, with a point-of-sale terminal. In some embodiments, a user activity may include one or more of the following: purchasing, renting, selling, and/or leasing goods and/or services (e.g., groceries, stamps, tickets, DVDs, vending machine items, and the like); withdrawing cash; making payments (e.g., paying monthly bills; paying federal, state, and/or local taxes; and the like); sending remittances; transferring balances from one account to another account; loading money onto stored value cards (SVCs) and/or prepaid cards; donating to charities; and/or the like.

As used herein, an "online banking account" is an account that is associated with one or more user accounts at a financial institution. For example, the user may have an online banking account that is associated with the user's checking account, savings account, investment account, and/or credit account at a particular financial institution. Authentication credentials comprising a username and password are typically associated with the online banking account and can be used by the user to gain access to the online banking account. The online banking account may be accessed by the user over a network (e.g., the Internet) via a computer device, such as a personal computer, laptop, or mobile device (e.g., a smartphone or tablet). The online banking account may be accessed by the user via a mobile or online banking website or via a mobile or online banking application. A customer may access an online banking account to view account balances, view transaction history, view statements, transfer funds, and pay bills. More than one user may have access to the same online banking account. In this regard, each user may have a different username and password. Accordingly, one or more users may have a sub-account associated with the online banking account.

A "user" may be an individual or group of individuals associated with an entity that provides the system for assessing network authentication requirements based on situational instance. In some embodiments, the "user" may be a financial institution user (e.g., an account holder or a person who has an account (e.g., banking account, credit account, or the like)). In one aspect, a user may be any financial institution user seeking to perform user activities associated with the financial institution or any other affiliate entities associated with the financial institution. In some embodiments, the user may be an individual who may be interested in opening an account with the financial institution. In some other embodiments, a user may be any individual who may be interested in the authentication features offered by the financial institution/entity. In some embodiments, a "user" may be a financial institution employee (e.g., an underwriter, a project manager, an IT specialist, a manager, an administrator, an internal operations analyst, bank teller or the like) capable of operating the system described herein. For purposes of this invention, the term "user" and "customer" may be used interchangeably.

With advancements in technology infrastructures and wireless communication implementation, electronic devices such as transaction terminals such as point of sale terminals, portable multi-function devices, such as laptop computers, tablet computers, mobile phones, smart phones, wearable devices and the like are common. Typically, individuals may also have a mobile user device with them. These electronic devices may enable performance of user activities (e.g., financial activities, purchases, resource transfers, accessing resource data stored at other systems and databases and the like) based on requisite authorization. These electronic devices may also be configured to allow the user to perform the one or more user activities, transactions or resource transfers through an application, accept authentication credentials from the user, transmit authentication credentials for validation at external systems, etc.

Embodiments of the present invention address the above needs and/or achieve other advantages by providing apparatuses (e.g., a system, computer program product and/or other devices) and methods for dynamically appending and transforming static activity data transmitted to a user device application, as will be described in detail elsewhere in the specification. FIG. 1 illustrates an electronic activity processing system environment 100, in accordance with some embodiments of the present invention. FIG. 1 provides a unique system that includes specialized servers and systems, communicably linked across a distributive network of nodes required to perform the functions of storing data and handling requests associated with the data.

As illustrated in FIG. 1, a processing system 108, or electronic activity processing system 108 or a data processing system 108 (e.g., a financial institution system 108) is operatively coupled, via a network 101 to user devices such as a first networked device 104, a second networked device 164, etc., to the recipient system 106 and/or to one or more secondary systems. In this way, the processing system 108 can send information to and receive information from the user devices such as a first networked device 104, a second networked device 164, etc., the recipient system 106, and one or more secondary systems. FIG. 1 illustrates only one example of an embodiment of the system environment 100, and it will be appreciated that in other embodiments of the systems, devices, or servers may be combined into a single system, device, or server, or be made up of multiple systems, devices, or servers.

The network 101 may be a system specific distributive network receiving and distributing specific network feeds and identifying specific network associated triggers. The network 101 may also be a global area network (GAN), such as the Internet, a wide area network (WAN), a local area network (LAN), or any other type of network or combination of networks. The network 101 may provide for wireline, wireless, or a combination wireline and wireless communication between devices on the network 101. In some embodiments, the network 101 may enable communication between devices thorough near-field communication, transmission of electromagnetic waves, sound waves or any other suitable means.

In some embodiments, the first user 102 is an individual that has a user device, i.e., the first networked device 104, such as a mobile phone, tablet, computing device, or the like and who seeks to perform one or more electronic activities or user activities. In some embodiments, the second user 162 is another individual that has a user device, i.e., the second networked device 164, such as a mobile phone, tablet, computing device, or the like and who seeks to perform one or more electronic activities or user activities.

FIG. 1 also illustrates the first networked device 104. The first networked device 104 (also referred to as a first user device or a user device, which may be associated with the first user 102) may refer to a device or a combination of devices that are configured to capture (e.g., receive and/or process) one or more instructions, inputs, authentication credentials, and the like from the user 102 such as a computing device (e.g., a mobile device, a smart phone, a laptop computer and/or another computing device), smart devices (e.g., smart TVs, smart doors, smart speakers, personal digital assistant devices), wearable devices (e.g., smart watches, fitness devices, virtual/augmented reality devices), Global Positioning System (GPS) devices, proximity/location sensors/beacon devices, visual capture devices and/or the like to capture authentication credentials associated with the user. The first networked device 104 may be, for example, a desktop personal computer, a mobile system, such as a cellular phone, smart phone, personal data assistant (PDA), laptop, or the like.

The first networked device 104 comprises a communication device 112 comprising input/output devices and/or sensors, a processing device 114, and a memory device 116. The memory device 116 can be a non-transitory computer-readable storage medium. The first networked device 104 may comprise other devices that are not illustrated, configured for location determination/navigation (GPS devices, accelerometers, etc.), for authentication (fingerprint scanners, microphones, iris scanners, etc.), for image capture (cameras, AR devices, etc.), for display (screens, touchscreens, hologram projectors, etc.), and other purposes. The first networked device 104 is a computing system that enables the user to perform one or more user activities, e.g., initiating one or more electronic activities such as resource transfers, payment requests, etc. via one or more applications associated with the first networked device 104.

The processing device 114 is operatively coupled to the communication device 112 and the memory device 116. The processing device 114 utilizes the communication device 112 to communicate with the network 101 and other devices on the network 101, such as, but not limited to, the processing system 108. For example, the communication device 112 can comprise a modem, a communications interface, a server, or other device for communicating with other devices on the network 101.

The first networked device 104 comprises the memory device 116, which can comprise computer-readable instructions 120 and data storage 118, which in one embodiment includes the computer-readable instructions 120 of a first resource application 122. The computer-readable instructions 120 can be computer-executable instructions that are executable by a processor and/or a processing device (e.g., the processing device 114). In some embodiments, the first networked device 104 may refer to multiple user devices that may be configured to communicate with each other, with the processing system, and/or other systems via the network 101. In some embodiments, the processing system 108 transmits data associated with the application 122 to and/or causes the processing device 114 to install/store the first resource application 122 on the first networked device 104. In some embodiments, the first resource application 122, when executed by the processing device 114, is configured to cause the first networked device 104 to perform one or more actions and/or steps described herein. In some embodiments, the first resource application 122 is similar to the electronic activity processing application 158 described below.

The first resource application 122 may be a standalone application configured for receiving data/instructions associated with an electronic activity from a user (e.g., via the first user interface 122a of the first resource application 122), transmitting electronic data and/or executing an action associated with the resource network as described herein, or the first resource application 122 may refer to one or more existing applications on the user device that are configured to perform one or more of these steps. The first resource application 122 may be configured to provide one or more request to the processing system 108. For example, the user of the first networked device 104 may request data that comprises one or more features from the processing system 108.

In some embodiments, the first resource application 122 may be associated with a resource network application that facilitates the first user 102 interacting with a resource network. For example, the first resource application 122 may be a payment network application structured for person-to person (P2P) payments and/or real time payments (RTP), with the second user 162 being a part of the same payment network and having a corresponding payment network application structured for person-to person (P2P) payments and/or real time payments (RTP) (second resource application 174). In some embodiments, the resource network may comprise the processing system 108 and/or a financial institution system may transmit electronic communications to the first networked device 104, which may be configured to cause the first resource application 122 to perform one or more functions, actions, or steps associated with electronic processing. For example, the electronic communications may cause the first resource application 122 to trigger one or more sensors or input devices of the first networked device 104 to capture and/or receive an authentication credential associated with the first user 102 based on instructions received via the electronic communications. The electronic communications may originate from the processing system 108, or another computing device in the system 100, to cause the first networked device 104 to request user input/information from the first user 102, and the like.

FIG. 1 also illustrates the second networked device 164. The second networked device 164 (also referred to as a second user device or a user device, which may be associated with the second user 162) may refer to a device or a combination of devices that are configured to capture (e.g., receive and/or process) one or more instructions, inputs, authentication credentials, and the like from the second user 162 such as a computing device (e.g., a mobile device, a smart phone, a laptop computer and/or another computing device), smart devices (e.g., smart TVs, smart doors, smart speakers, personal digital assistant devices), wearable devices (e.g., smart watches, fitness devices, virtual/augmented reality devices), GPS devices, proximity/location sensors/beacon devices, visual capture devices and/or the like to capture authentication credentials associated with the user. The second networked device 164 may be, for example, a desktop personal computer, a mobile system, such as a cellular phone, smart phone, personal data assistant (PDA), laptop, or the like.

The second networked device 164 comprises a communication device 162 comprising input/output devices and/or sensors, a processing device 168, and a memory device 170. The memory device 170 can be a non-transitory computer-readable storage medium. The second networked device 164 may comprise other devices that are not illustrated, configured for location determination/navigation (GPS devices, accelerometers, etc.), for authentication (fingerprint scanners, microphones, iris scanners, etc.), for image capture (cameras, AR devices, etc.), for display (screens, touchscreens, hologram projectors, etc.), and other purposes. The second networked device 164 is a computing system that enables the user to perform one or more user activities, e.g., initiating one or more electronic activities such as resource transfers, payment requests, etc. via one or more applications associated with the first networked device 104.

The processing device 168 is operatively coupled to the communication device 162 and the memory device 170. The processing device 168 utilizes the communication device 162 to communicate with the network 101 and other devices on the network 101, such as, but not limited to the processing system 108. For example, the communication device 162 can comprise a modem, a communications interface, a server, or other device for communicating with other devices on the network 101.

The second networked device 164 comprises the memory device 170, which can comprise computer-readable instructions 172 and data storage 178, which in one embodiment includes the computer-readable instructions 172 of a second resource application 174. The computer-readable instructions 172 can be computer-executable instructions that are executable by a processor and/or a processing device (e.g., the processing device 168). In some embodiments, the second networked device 164 may refer to multiple user devices that may be configured to communicate with each other, with the processing system, and/or other systems via the network 101. In some embodiments, the processing system 108 transmits data associated with the application 174 to and/or causes the processing device 168 to install/store the second resource application 174 on the second networked device 164. In some embodiments, the second resource application 174, when executed by the processing device 168, is configured to cause the second networked device 164 to perform one or more actions and/or steps described herein. In some embodiments, the second resource application 174 is similar to the electronic activity processing application 158 described below.

The second resource application 174 may be a standalone application configured for receiving data/instructions associated with an electronic activity from a user (e.g., via the second user interface 174a of the second resource application 174), transmitting electronic data and/or executing an action associated with the resource network as described herein, or the second resource application 174 may refer to one or more existing applications on the user device that are configured to perform one or more of these steps. The second resource application 174 may be configured to provide one or more request to the processing system 108. For example, the user of the second networked device 164 may request data that comprises one or more features from the processing system 108.

In some embodiments, the second resource application 174 associated with the second user 162 may be associated with a resource network. For example, the second resource application 174 may be a payment network application structured for person-to person (P2P) payments and/or real time payments (RTP), with the first user 102 being a part of the same payment network and having a corresponding payment network application structured for person-to person (P2P) payments and/or real time payments (RTP) (first resource application 122). In some embodiments, the processing system 108 and/or a financial institution system may transmit electronic communications to the second networked device, which may be configured to cause the second resource application 174 to perform one or more functions or steps associated with electronic processing. For example, the electronic communications may cause the second resource application 174 to trigger one or more sensors or input devices of the second networked device 164 to capture and/or receive an authentication credential associated with the second user 162 based on instructions received via the electronic communications. The electronic communications may originate from the processing system 108, or another computing device in the system 100, to cause the second networked device 164 to request user input/information from the second user 162, and the like.

As further illustrated in FIG. 1, the processing system 108 or the electronic activity processing system 108 generally comprises a communication device 146, a processing device 148, and a memory device 150. The memory device 150 can be a non-transitory computer-readable storage medium. As used herein, the term "processing device" generally includes circuitry used for implementing the communication and/or logic functions of the particular system. For example, a processing device may include a central processing unit (CPU), a digital signal processor device, a microprocessor device, and various analog-to-digital converters, digital-to-analog converters, and other support circuits and/or combinations of processing devices. Control and signal processing functions of the system are allocated between these processing devices according to their respective capabilities. The processing device 108 may be configured to operate one or more software programs and/or applications based on computer-readable instructions 154, which may be stored in a memory device 150. The computer-readable instructions 154 can be computer-executable instructions that are executable by a processor and/or a processing device (e.g., the processing device 148).

The processing device 148 is operatively coupled to the communication device 146 and the memory device 150. The communication device 146 can comprise a modem, a server, a communications interface, or other device for communicating with other devices on the network 101. The processing device 148 uses the communication device 146 to communicate with the network 101 and other devices on the network 101, such as, but not limited to the recipient system 106, the user device(s) 104, 164, and/or additional devise in communication with the network 101.

The processing system 108 comprises computer-readable instructions 154 stored in the memory device 150, which in one embodiment includes the computer-readable instructions 154 of an electronic activity processing application 158. In some embodiments, the memory device 150 includes data storage 152 for storing data associated with the processing system 108. For example, the data can be associated with the electronic activity processing application 158, the system 108, and/or the system 100. In some embodiments, executing the computer readable instructions of the electronic activity processing application 158 causes the processing device 148 to perform one or more steps and/or actions for electronic activity processing described herein.

The electronic activity processing application 158 may receive electronic activity data from the user devices, e.g., the first networked device 104 and/or the second networked device 164. In some embodiments, the processing system 108 may retrieve user authentication information, capture device information, financial information, identifiers, resource account information, and the like from the user devices (e.g., the first networked device 104, the second networked device 164, etc.) and/or the recipient system 106. In this way, the electronic activity processing application 158 may communicate with the recipient system 106, the user devices (e.g., the first networked device 104, the second networked device 164, etc.), a resource network, merchant systems, and other third-party systems.

In some embodiments, the electronic activity processing application 158 may control the functioning of the first networked device 104 and/or the second networked device 164. In some embodiments, the electronic activity processing application 158 may comprise computer readable instructions 154 or computer-readable program code, that when executed by the processing device 148, causes the processing device 148 to perform one or more steps described herein and/or transmit data to other systems and devices to cause the systems and devices to perform specific tasks. For example, the electronic activity processing application 158 can cause the processing device 148 to perform a search for data requested by another device (e.g., the first networked device 104, the second networked device 164, etc.)

As illustrated in FIG. 1, the recipient system 106 is connected to the processing system 108 and may be associated with a financial institution network (e.g., a recipient bank for a resource transfer activity, an account transfer electronic activity, etc.). The recipient system 106 may refer to a financial institution system, a transaction terminal or other devices or systems associated with performing the activity. In this way, while only one recipient system 106 is illustrated in FIG. 1, it is understood that multiple network systems may make up the system environment 100. In some embodiments, the recipient system 106 is substantially similar to the processing system 108. The recipient system 106 generally comprises a communication device 136, a processing device 138, and a memory device 140. The memory device 140 can be a non-transitory computer-readable storage medium. The recipient system 106 comprises computer-readable instructions 142 stored in the memory device 140. The computer-readable instructions 142 can be computer-executable instructions that are executable by a processor and/or a processing device (e.g., the processing device 138). In some embodiments, the processing system 108 (e.g., based on executing the application 158) transmits and/or causes the processing device 138 to install/store one or more applications on the recipient system 106. In some embodiments, the computer readable instructions 142, when executed by the processing device 138 is configured to cause the recipient system 106 to perform one or more steps described herein. The recipient system 106 may communicate with the processing system 108 to receive static activity data sets, indicate processing of static activity data sets, indicate completion of an electronic activity, request validation of authentication credentials, confirm a resource transfer, and the like. The processing system 108 may communicate with the recipient system 106 via a secure connection 160 generated for secure encrypted communications between the two systems. In some embodiments, the secure connection 160 may be an operative communication link/channel established via the network 101.

It is understood that the servers, systems, and devices described herein illustrate one embodiment of the invention. It is further understood that one or more of the servers, systems, and devices can be combined in other embodiments and still function in the same or similar way as the embodiments described herein.

FIG. 2 illustrates a flowchart of an exemplary method 200. The method 200 can be a computerized method. At block 202, a first request for data associated with a database is received by a cache device from a computing device. The first request can indicate one or more desired features of the data.

At block 204, a feature catalog is searched for the data that comprises the one or more desired features. The feature catalog can comprise data associated with a plurality of requests that were previously processed. Each of the plurality of requests that were previously processed can comprise respective one or more desired features of the data.

At block 206, whether the feature catalog comprises the requested data is determined based on the search of the feature catalog. The feature catalog can comprise a multi-dimensional matrix that indicates the one or more features in a first dimension of the multi-dimensional matrix. The multi-dimensional matrix can indicate the data associated with the one or more features in a second dimension of the multi-dimensional matrix. The feature catalog can comprise a multi-dimensional feature attribute matrix that indicates the one or more features in a first dimension of the multi-dimensional matrix, and the multi-dimensional matrix indicates the additional data attributes associated with the one or more features in a second, third, and additional dimension of the multi-dimensional matrix. The feature catalog can be updated in real-time utilizing a deep learning neural network comprising a plurality of Long Short-Term Memory (LSTM) cells configured to update the feature catalog based on a respective relevancy of the respective one or more desired features of the data. The LSTM cells can be uniquely configured to update the feature catalog. The deep learning neural network can comprise a multi-layer neural network. Additionally, each of the LSTM cells of the deep learning network can comprise at least one of a forget gate, an input gate, a vector gate, and an output gate. Further, each of the LSTM cells can be configured to output a respective weighted output that indicates a relevance of a data input based on the one or more desired features.

At block 208, if the feature catalog comprises the requested data, the requested data is transmitted to the computing device. The cache device can determine one or more locations of the requested data within memory associated with the cache device based on one or more pointers associated with the feature catalog. The cache device can retrieve the requested data from the memory based on the one or more locations of the requested data within the memory. The cache device can transmit the retrieved data to the computing device.

At block 210, if the feature catalog does not comprise the requested data, a second request for the data comprising the one or more desired features is transmitted to the database. The database can be configured to receive the second request for the data. The database can determine whether or not the database comprises the requested data. If the database does comprise the requested data, the database can transmit a communication that indicates the requested data to a messaging device. The cache device can receive the requested data from the database via the messaging device.

If the database does comprise the requested data, the database can transmit to a collection device a first communication that indicates that the database does not comprise the requested data. In response to receiving the first communication, the collection device can collect data from an external data resource. The collection device can transmit the collected data to the database. The database can determine that the collected data comprises the requested data and can transmit the requested data to the cache device via a messaging device. The database can also transmit a first communication to a messaging device that indicates that the database does not comprise the requested data. The messaging device can transmit a second communication to the cache device indicating that the database does not comprise the requested data. In response to receiving the second communication, the cache device can transmit a third communication to the computing device that indicates that the requested data could not be determined.

In another embodiment, a collection device collects the data associated with the database from an external data resource. The external data resource can be external relative to a network associated with the cache device. The collection device can transmit the collected data to the database. The database can update the data stored in the databased based on the collected data.

FIG. 3 illustrates an exemplary system 300 for processing data analytics within memory. Specifically, the system 300 illustrates a resource network 301 that comprises a data collection device 304, a storage device 306, a communication device 308, a cache device 310, and a computing device 316, as well as an external resource provider 302.

The external data resource 302 can be a data provider that is external to the resource network 301. For example, the external data resource 302 can be a third-party data analytics resource that provides data to the resource network 301. The external data resource 302 can comprise one or more computing devices and/or databases configured to provide data to the resource network 301. The external data resource 302 can provide data that may improve the functioning of the resource network 301, such as data related to security analytics to improve the security of the resource network 301. While a single external data resource 302 is shown for ease of explanation, a person of ordinary skill in the art would appreciate that the system 300 can comprise any number of external data resources 302.

The data collection device 304 can comprise one or more computing devices and/or databases configured to receive and/or collect data from an external data resource (e.g., the external data resource 302). The data collection device 304 can be configured to retrieve data from the external data resource 302. For example, the data collection device 304 can be configured to request data from the external data provider 302. As another example, the data collection device 304 can be configured to receive pushed updates regarding the data from the external data provider 302. In an exemplary embodiment, the data collection device 304 is configured to run a Python Application Programming Interface (API) to collect data from the external data resource 302. The data collection device 304 can be configured to provide the collected data to another device (e.g., the storage device 306). While a single data collection device 304 is shown for ease of explanation, a person of ordinary skill in the art would appreciate that more than one data collection device 304 can be utilized.

The storage device 306 can comprise one or more computing devices and/or databases configured to store data. Specifically, the storage device 306 can be configured to store data received from the data collection device 304. In one exemplary embodiment, the storage device 306 is configured to run MySQL. The storage device 306 can comprise a plurality of storage devices configured to store the data. For example, the storage device 306 can be a database comprising a plurality of storage devices. As another example, the storage device 306 can be a distributed storage system that comprises a plurality of databases that be located at a plurality of locations. The storage device 306 can be configured to communicate with the communication device 308 and the cache device 310. The storage device 306 can communicate updates related to the data stored within the storage device 306 to the cache device 310 to ensure that any devices requesting the stored data has the most up-to-date information regarding the stored data.

The communication device 308 can be configured to communicate with the storage device 306 and the cache device 310. In one exemplary embodiment, the communication device 308 can receive communications from the storage device 306 and provide data associated with the communications to the cache device 310. For example, the storage device 306 can send communications to the communication device 308 that indicate one or more updates of the data stored by the storage device 306. The communication device 308 can receive the communications from the storage device 306 and can be configured to determine one or more communications to send to the cache device 310. The communication device 308 can be configured to modify the communications received from the storage device 306 to a format that the cache device 310 can utilize. For example, the storage device 306 and the cache device 310 can comprise different communication protocols such that the storage device 310 cannot send direct communications to the cache device 310. Accordingly, the communication device 308 can be configured to translate the communications received from the storage device 306 into a format and/or protocol associated with the cache device 310. In one exemplary embodiment, the messaging device is configured to utilize Kafka.

The cache device 310 can comprise one or more computing devices and/or databases configured to cache data received from the storage device 306. The cache device 310 comprise a variety of computer readable media. As an example, computer readable media can be any available media and comprises, for example and not meant to be limiting, both volatile and non-volatile media, removable and non-removable media. The cache device 310 can comprise computer readable media in the form of volatile memory, such as random access memory (RAM), and/or non-volatile memory, such as read only memory (ROM).

In another example, the cache device 310 can also comprise other removable/non removable, volatile/non-volatile computer storage media. The cache device 310 can provide non-volatile storage of computer code, computer readable instructions, data structures, program modules, and so forth. For example, a mass storage device can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

The cache device 310 can comprise memory that is higher performance than the storage device 306. For example, the cache device 310 can comprise memory that is faster, but more expensive, in comparison to the storage device 306, such that the cache device 310 processes data quicker than the storage device 306, but may be prohibitively expensive to store the entire amount of data stored on the storage device 306 on the cache device 310. The cache device 310 can be configured to store a portion of the data stored by the storage device 306. The portion of the data can be data that is regularly utilized and/or accessed. By storing the portion of the data, the cache device 310 can process requests associated with the portion of the data faster than the storage device 306 would be able to. However, if the portion of the data does not have the data requested, the cache device 310 may need to request the from the storage device 306, which will take more time than if the cache device 310 comprises the requested data.

The computing device 316 can be a computing device that is configured to communicate with the cache device 310. For example, the computing device 316 can request data from the cache device 310. The request may indicate one or more features associated with the data that the computing device 316 desires the cache device 310 to produce. The cache device 310 can be configured to process the request and provide the requested data to the computing device 316.

The cache device 310 can comprise a feature catalog 312. The feature catalog 312 can comprise data associated with one or more requests from the computing device 316. For example, the computing device 316 can request data from the cache device 310 that comprises one or more features. The cache device 310 can determine the data that comprises the one or more features by searching through the stored data to identify any data that satisfies the one or more features. Once the cache device 310 has determined the data that comprises the one or more features, the cache device 310 can store the data, along with the associated one or more features, in the feature catalog 312. The cache device 310 can utilize the feature catalog 312 to determine whether the requested one or more features have been previously applied to the data stored by the cache device 310 and/or the storage device 306 to quickly provide the requested information to the computing device 316.

The feature catalog 312 can comprise a matrix of data. The matrix can be a multi-dimensional matrix. In one exemplary embodiment, one dimension of the feature catalog 312 comprises one or more features, and a different dimension of the feature catalog 312 comprises a correlation between the one or more features and a specific data point. The cache device 310 can add entries to the feature catalog 312 as the cache device 310 processes each request so that the next time a new request comes in that requests one or more features that have previously been processed by the cache device 310, the cache device 310 can quickly handle the request without needing to search anew for the data.

Accordingly, the cache device 310 utilizes the feature catalog 312 as a shortcut to directly find the data associated with one or more features without needing to process all of the data within the cache device 310 to determine the data that is associated with the one or more features. Thus, the feature catalog 312 improves the performance of the cache device 310 by reducing the computational resources required to process a request for data.

The cache device 310 can comprise a deep learning neural network 314. The cache device 310 can utilize the deep learning neural network 314 to improve and/or update the feature catalog 312. In one exemplary embodiment, the deep learning neural network 314 utilizes Long Short-Term Memory (LSTM) to update the feature catalog 312. The deep learning neural network 314 can comprise a plurality of LSTM cells. In another exemplary embodiment, the deep learning neural network 314 utilizes a unique self-correcting configuration of LSTM such that the deep learning neural network 314 can improve over time. For example, the deep learning neural network 314 can utilize feedback to modify the output of the LSTM cells. As an example, the deep learning neural network 314 can modify one or more weights associated with an output of one or more of the LSTM cells to improve the performance of the deep learning neural network 314. The deep learning neural network 314 can be configured to update the feature catalog 312 in real time by utilizing LSTM. For example, the deep learning neural network 314 can be configured to update the feature catalog 312 based on utilizing one or more LSTM models. The deep learning neural network 314 can be configured as single layer neural network or a multi-layer neural network comprising a plurality of LSTM cells. The deep learning neural network 314 can comprise a plurality of LSTM cells that are configured to update the feature catalog 312 based on a respective relevancy of one or more desired features of the data. For example, each of the plurality of LSTM cells can receive as input, input data and a feature attribute associated with the input data. Each of the LSTM cells can process the input data and the feature attribute associated with the input data to determine a weighted output that indicates the relevancy of the input data with the feature attribute. The weighted output can be configured to maximize the relevancy of the input data with the feature attribute. In one exemplary embodiment, the weight of the output is increased as the relevancy increases, and the weight of the output is decreased as the relevancy decreases.

The cache device 310 can also comprise a classifier for classifying the data. The classifier can be configured to receive the data and output a probability that indicates the accuracy of the classification of the data. In one exemplary embodiment, the output comprises a non-linear probabilistic function that maximizes the accuracy of the classification of the data. The classifier may be a trained classifier that was trained from a training data set. The training data set may comprise previously known data that indicates a known input with a known result. The classifier can be trained based on this training data set to more improve the operation of the cache device 310. Additionally, the classifier can be continually trained based on all of the data the classifier receives to further refine and improve the operation of the classifier.

The cache device 310 may be configured to implement any of the following applicable machine learning algorithms either singly or in combination: supervised learning (e.g., using logistic regression, using back propagation neural networks, using random forests, decision trees, etc.), unsupervised learning (e.g., using an Apriori algorithm, using K-means clustering), semi-supervised learning, reinforcement learning (e.g., using a Q-learning algorithm, using temporal difference learning), and any other suitable learning style.

Each module of the plurality can implement any one or more of: a regression algorithm (e.g., ordinary least squares, logistic regression, stepwise regression, multivariate adaptive regression splines, locally estimated scatterplot smoothing, etc.), an instance-based method (e.g., k-nearest neighbor, learning vector quantization, self-organizing map, etc.), a regularization method (e.g., ridge regression, least absolute shrinkage and selection operator, elastic net, etc.), a decision tree learning method (e.g., classification and regression tree, iterative dichotomiser 3, C4.5, chi-squared automatic interaction detection, decision stump, random forest, multivariate adaptive regression splines, gradient boosting machines, etc.), a Bayesian method (e.g., naïve Bayes, averaged one-dependence estimators, Bayesian belief network, etc.), a kernel method (e.g., a support vector machine, a radial basis function, a linear analysis, etc.), a clustering method (e.g., k-means clustering, expectation maximization, etc.), an associated rule learning algorithm (e.g., an Apriori algorithm, an Eclat algorithm, etc.), an artificial neural network model (e.g., a Perceptron method, a back-propagation method, a Hopfield network method, a self-organizing map method, a learning vector quantization method, etc.), a deep learning algorithm (e.g., a restricted Boltzmann machine, a deep belief network method, a convolution network method, a stacked auto-encoder method, etc.), a dimensionality reduction method (e.g., principal component analysis, partial least squares regression, Sammon mapping, multidimensional scaling, projection pursuit, etc.), an ensemble method (e.g., boosting, bootstrapped aggregation, AdaBoost, stacked generalization, gradient boosting machine method, random forest method, etc.), and any suitable form of machine learning algorithm.

The cache device 310 can additionally or alternatively leverage: a probabilistic module, heuristic module, deterministic module, or any other suitable module leveraging any other suitable computation method, machine learning method or combination thereof. However, any suitable machine learning approach can otherwise be incorporated within the cache device 310. Further, any suitable model (e.g., machine learning, non-machine learning, etc.) can be used in generating data relevant to the cache device 310.

FIG. 4 illustrates an exemplary system 400 for processing data analytics within memory. Specifically, the system 400 illustrates an exemplary embodiment of the deep learning neural network 314 configured as a single layer LSTM network comprising a plurality of LSTM cells 404, 410, 416. Each of the LSTM cells 404, 410, 416 can be configured identically or differently. Stated differently, while each of the LSTM cells 404, 410, 416 are given different reference numerals for ease of explanation, each of the LSTM cells 404, 410, 416 can be configured to operate in the same manner or in different manners. Additionally, while each of the feature attributes 406, 412, 418 are given different reference numerals for ease of explanation each of the feature attributes 406, 412, 418 can be the same or different. While three LSTM cells and three feature attributes are shown for ease of explanation, a person of ordinary skill in the art would appreciate that the system 400 can comprise any number of LSTM cells and feature attributes.

As shown, the deep learning neural network 314 receives input data 402, as well as a plurality of feature attributes 406, 412, 418. Specifically, the LSTM cell 404 receives the input data 402, as well as the feature attribute 406. The LSTM cell 404 can be configured to process all of the input data 402 or a portion of the input data 402. The LSTM cell 404 processes the input data 402 in relation to the feature attribute 406 to determine a weighted output 408. The weighted output 408 indicates the relevancy of the data processed by the LSTM cell 404 to the feature attribute 406. The LSTM cell 404 can provide (e.g., transmit) the weighted output 408 to the LSTM cell 410 for processing.

The LSTM cell 410 receives the weighted output 408 as an input for the LSTM cell 410. The LSTM cell 410 processes the weighted output 408 in relation to the feature attribute 412 to determine a weighted output 414. The weighted output 414 indicates the relevancy of the data processed by the LSTM cell 410 to the feature attribute 412. The feature attribute 412 can be the same feature attribute as feature attribute 406 or a different feature attribute than the feature attribute 406. The LSTM cell 410 can provide (e.g., transmit) the weighted output 414 to the LSTM cell 416 for processing.

The LSTM cell 416 receives the weighted output 414 as an input for the LSTM cell 416. The LSTM cell 416 processes the weighted output 414 in relation to the feature attribute 418 to determine a weighted output 420. The weighted output 420 indicates the relevancy of the data processed by the LSTM cell 416 to the feature attribute 418. The feature attribute 418 can be the same feature attribute as feature attributes 406 and 412, or a different feature attribute than the feature attributes 406 and 412. The LSTM cell 416 can provide (e.g., transmit) the weighted output 420 as the output data 422.

The output data 422 can comprise relevant portions of the input data 402 based on the feature attributes 406, 412, 418. The LSTM cells 404, 410, 416 can be configured to remove data based on relevancy. For example, the LSTM cells 404, 410, 416 can be configured to remove data from the input data 402 based on relevancy. The LSTM cells 404, 410, 416 can be configured to process data input to each of the LSTM cells 404, 410, 416 (e.g., the input data 402, the weighted output 408, the weighted output 414, the weighted output 420, etc.) and determine if any of the data is irrelevant based on the feature attributes 406, 412, 418. For example, if the LSTM cell 404 determines that a portion of the input data 402 is irrelevant based on the feature attribute 406, the LSTM cell 404 may remove the portion of the input data 402 and output the weighted output 408 without the irrelevant portion so that the remaining LSTM cells 410, 416 do not process the irrelevant data. As another example, if the LSTM cell 404 determines that a portion of the data associated with the LSTM cell 404 is irrelevant due to being outdated (e.g., associated with a different search, associated with different data, not associated with the feature attribute 406, etc.), the LSTM cell 404 may remove the data. The LSTM cell 404 may replace the removed data with data that is relevant based on the feature attribute 406.

The deep learning neural network 314 can be configured to modify one or more operations associated with the LSTM cells 404, 410, 416. As shown, the deep learning neural network 314 can have a feedback loop 424. The feedback loop 424 allows for back propagation of data so that the operation of the LSTM cells 404, 410, 416 can be improved. For example, the deep learning neural network 314 utilizes the feedback loop 424 to determine whether one or more weights associated with the LSTM cells 404, 410, 416 needs to be adjusted. As an example, the deep learning neural network 314 may determine that the LSTM cell 404 needed to weight a portion of the input data 402 differently (e.g., a higher weight, a lower weight, etc.) to improve the accuracy of the output data 422 based on the feature attributes 406, 412, 418. Thus, the deep learning neural network 314 can modify the operation of the LSTM cell 404 so that the LSTM cell 404 applies the proper weight Accordingly, operation of the LSTM cell 404 can be modified in order to improve the operation of the LSTM cell 404 in processing the input data 402 to improve the accuracy of the output data 422.

FIG. 5 illustrates an exemplary system 500 comprising a multi-layer neural network. Specifically, the system 500 comprises the same components as the system 400, but doubled to create a dual-layer neural network as opposed to the single-layer neural network as described with reference to FIG. 4. Further, while not shown for ease of explanation, the deep learning neural network 314 can comprise the LSTM cells 504, and the feature catalog 312 can comprise the feature attributes 506. Accordingly, the components of the system 500 can incorporate the functionality and operation of the similar named components of the system 400. While a second layer of the neural network is shown for ease of explanation, the neural network may include any number of layers.

As shown, the LSTM cell 504a receives the input data 502a,b. The LSTM cell 504a process the received data based on the feature attribute 506a and provides a weighted output to the LSTM cells 504b,e. Similarly, the LSTM cell 504d receives the input data 502a,b. The LSTM cell 504d process the received data based on the feature attribute 506d and provides a weighted output to the LSTM cells 504b,e. The LSTM cell 504b receives the weighted output from the LSTM cells 504a,d and processes the received data based on the feature attribute 506b. The LSTM cell 504b provides a weighted output to the LSTM cells 504c,f. Similarly, the LSTM cell 504e receives the weighted output from the LSTM cells 504a,d and processes the received data based on the feature attribute 506e. The LSTM cell 504e provides a weighted output to the LSTM cells 504c,f. The LSTM cell 504c receives the weighted output from the LSTM cells 504b,e and processes the received data based on the feature attribute 506c. The LSTM cell 504c provides a weighted output to output data 508a,b. Similarly, the LSTM cell 504f receives the weighted output from the LSTM cells 504b,e and processes the received data based on the feature attribute 506f. The LSTM cell 504f provides a weighted output to output data 508a,b.

The multi-layer neural network can improve the processing of data as compared to a single-layer neural network. For example, accuracy of the neural network can be improved by having the LSTM cell 504a and the LSTM cell 504d both process the data based on the same attribute (e.g., the feature attribute 506a and 506d are the same). Thus, by having redundant processing on the data that was provided (e.g., the input data 502a,b,), the accuracy of the neural network can be improved to ensure that the data output from the LSTM cell 504a and the LSTM cell 504d are similar. As another example, the processing speed of the neural network can be increased by distributing the data across additional LSTM cells so that each of the different LSTM cells is processing based on a different feature attribute to reduce the time required to process the input data. Thus, the multi-layer neural network has improved performance and functionality as compared to a single-layer neural network. Additionally, while a feedback loop is not shown for ease of explanation, a person of ordinary skill in the art would appreciate that the system 500 can include a feedback loop, which can be utilized to improve the performance of the multi-layer neural network.

FIG. 6 illustrates an exemplary Long Short-Term Memory (LSTM) cell 600. As shown, the LSTM 600 comprises a forget gate 606, an input gate 608, a vector gate 610, and an output gate 612. The LSTM cells 404, 410, 416 of FIG. 4, and the LSTM cells 504 of FIG. 5 can comprise the capabilities of the LSTM cell 600. As shown, the forget gate 606, the input gate 608, the vector gate 610, and the output gate 612 receive input data 602b and a feature attribute 604. The forget gate 606 receives the input data 602b and the feature attribute 604 to determine whether any data stored within the LSTM cell 600 needs to be forgotten. For example, if the LSTM cell 600 comprises outdated data (e.g., a data attribute from a previous search that is no longer relevant to the user, etc.), the forget gate 606 will remove the outdated data to allow for new data to be stored within the LSTM cell 600. The forget gate 606 can provide an output to the pointwise operation 616.

The pointwise operation 616 can receive input data 602a. The pointwise operation 616 can comprise a vector multiplication operation. The pointwise operation 616 can process the received data (e.g., the output from the forget gate 606 and the input data 602a) to determine an output. The pointwise operation 616 can provide the output to the pointwise operation 620.

The input gate 608 receives the input data 602b and the feature attribute 604 to determine new data to store within the LSTM cell 600. Specifically, the input gate 608 determines which values of the input data 602b to update. For example, the input gate 608 can determine which values of the input data 602b to update based on the feature attribute 604. The input gate 608 can provide an output to the pointwise operation 618.

The vector gate 610 receives the input data 602b and the feature attribute 604 to determine new data to store within the LSTM cell 600. Specifically, the vector gate 610 determines a vector which comprises potential candidates of data to store within the LSTM cell 600. For example, the vector gate 610 can determine the vector of potential candidates of the data to store within the LSTM cell 600 based on the feature attribute 604. In an exemplary embodiment, the vector comprises a multi-dimensional vector array that comprises a feature data set. The vector gate 610 can provide an output to the pointwise operation 618. In one exemplary embodiment, the vector gate 610 applies tan h to the input data to force the output of the vector gate to be between −1 and 1.

The pointwise operation 618 can receive data output from the input gate 608 and can receive data output from the vector gate 610. The pointwise operation 618 can comprise a vector multiplication operation. The pointwise operation 618 can process the received data (e.g., the output from the input gate 608 and the vector gate 610) to determine an output. The pointwise operation 618 can provide the output to the pointwise operation 620.

The pointwise operation 620 can receive data output from the pointwise operation 616 and can receive data output from the pointwise operation 618. The pointwise operation 620 can comprise a vector addition operation. The pointwise operation 620 can process the received data (e.g., the output from the pointwise operation 616 and the pointwise operation 618) to determine an output. The pointwise operation 620 can provide the output to the output data 614a and a pointwise operation 622. In an exemplary embodiment, the output data 614a comprises a cell state of the LSTM cell 600.

The output gate 612 receives the input data 602b and the feature attribute 604 to determine an output for the LSTM cell 600. Specifically, the output gate 612 determines a feature attribute to apply to the data by another LSTM cell. For example, the output gate 612 can determine an improved feature attribute for the another LSTM cell (e.g., more relevant) based on the feature attribute 604 and the input data 602b. The output gate 612 can provide an output to the pointwise operation 622. In one exemplary embodiment, the output gate 612 provides one or more modified weights to apply to the data to improve processing of the data. For example, the one or more modified weights can improve a relevancy correlation (e.g., whether data that is identified as relevant is actually relevant or was incorrectly identified as relevant) to improve the accuracy of the processing of the data.

The pointwise operation 622 can receive data output from the output gate 612 and can receive data output from the pointwise operation 620. The pointwise operation 622 can comprise a vector multiplication operation. The pointwise operation 622 can process the received data (e.g., the output from the output gate 612 and the pointwise operation 620) to determine an output. The pointwise operation 622 can provide the output to the output data 614b. In an exemplary embodiment, the output data 614b comprises data that can be utilized by another LSTM cell to improve the operation of the another LSTM cell, as well as adjustments to one or more cell parameters of the another LSTM.

As will be appreciated by one of skill in the art, the present invention may be embodied as a method (including, for example, a computer-implemented process, a business process, and/or any other process), apparatus (including, for example, a system, machine, device, computer program product, and/or the like), or a combination of the foregoing. Accordingly, embodiments of the present invention may take the form of an entirely hardware embodiment, an entirely software embodiment (including firmware, resident software, micro-code, and the like), or an embodiment combining software and hardware aspects that may generally be referred to herein as a "system." Furthermore, embodiments of the present invention may take the form of a computer program product on a computer-readable medium having computer-executable program code embodied in the medium.

Any suitable transitory or non-transitory computer readable medium may be utilized. The computer readable medium may be, for example but not limited to, an electronic, magnetic, optical, electromagnetic, infrared, or semiconductor system, apparatus, or device. More specific examples of the computer readable medium include, but are not limited to, the following: an electrical connection having one or more wires; a tangible storage medium such as a portable computer diskette, a hard disk, a random access memory (RAM), a read-only memory (ROM), an erasable programmable read-only memory (EPROM or Flash memory), a compact disc read-only memory (CD-ROM), or other optical or magnetic storage device.

In the context of this document, a computer readable medium may be any medium that can contain, store, communicate, or transport the program for use by or in connection with the instruction execution system, apparatus, or device. The computer usable program code may be transmitted using any appropriate medium, including but not limited to the Internet, wireline, optical fiber cable, radio frequency (RF) signals, or other mediums.

Computer-executable program code for carrying out operations of embodiments of the present invention may be written in an object oriented, scripted or unscripted programming language. However, the computer program code for carrying out operations of embodiments of the present invention may also be written in conventional procedural programming languages, such as the "C" programming language or similar programming languages.

Embodiments of the present invention are described above with reference to flowchart illustrations and/or block diagrams of methods, apparatus (systems), and computer program products. It will be understood that each block of the flowchart illustrations and/or block diagrams, and/or combinations of blocks in the flowchart illustrations and/or block diagrams, can be implemented by computer-executable program code portions. These computer-executable program code portions may be provided to a processor of a general purpose computer, special purpose computer, or other programmable data processing apparatus to produce a particular machine, such that the code portions, which execute via the processor of the computer or other programmable data processing apparatus, create mechanisms for implementing the functions/acts specified in the flowchart and/or block diagram block or blocks.

These computer-executable program code portions may also be stored in a computer-readable memory that can direct a computer or other programmable data processing apparatus to function in a particular manner, such that the code portions stored in the computer readable memory produce an article of manufacture including instruction mechanisms which implement the function/act specified in the flowchart and/or block diagram block(s).

The computer-executable program code may also be loaded onto a computer or other programmable data processing apparatus to cause a series of operational steps to be performed on the computer or other programmable apparatus to produce a computer-implemented process such that the code portions which execute on the computer or other programmable apparatus provide steps for implementing the functions/acts specified in the flowchart and/or block diagram block(s). Alternatively, computer program implemented steps or acts may be combined with operator or human implemented steps or acts in order to carry out an embodiment of the invention.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

Embodiments of the present invention are described above with reference to flowcharts and/or block diagrams. It will be understood that steps of the processes described herein may be performed in orders different than those illustrated in the flowcharts. In other words, the processes represented by the blocks of a flowchart may, in some embodiments, be in performed in an order other that the order illustrated, may be combined or divided, or may be performed simultaneously. It will also be understood that the blocks of the block diagrams illustrated, in some embodiments, merely conceptual delineations between systems and one or more of the systems illustrated by a block in the block diagrams may be combined or share hardware and/or software with another one or more of the systems illustrated by a block in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for processing data analytics within memory, the system comprising:
    at least one memory device;
    at least one communication device connected to a communications network;
    at least one processing device operatively coupled to the at least one memory device; and
    a module stored in the at least one memory device comprising executable instructions that when executed by the at least one processing device, cause the at least one processing device to:
        receive, from a computing device by a cache device, a first request for data associated with a database, wherein the first request indicates one or more desired features of the data,
        search a feature catalog for the data that comprises the one or more desired features, wherein the feature catalog comprises data features associated with a plurality of requests that were previously processed, wherein each of the plurality of requests comprises respective one or more desired features of the data,
        determine, based on the search of the feature catalog, whether the feature catalog comprises the requested data, wherein the feature catalog is updated in real-time utilizing a deep learning neural network comprising a plurality of Long Short-Term Memory (LSTM) cells configured to update the feature catalog based on a respective relevancy of the respective one or more desired features of the data,
        if the feature catalog comprises the requested data, transmit the requested data to the computing device, and
        if the feature catalog does not comprise the requested data, transmit a second request for the data comprising the one or more desired features to the database, wherein the deep learning neural network comprises a multi-layer neural network, wherein each of the plurality of LSTM cells comprises at least one of a forget gate, an input gate, a vector gate and an output gate, and wherein each of the plurality of LSTM cells outputs a respective weighted output that indicates a relevancy of a data input based on the one or more desired features.

2. The system of claim 1, wherein the feature catalog comprises a multi-dimensional matrix that indicates the one or more features in a first dimension of the multi-dimensional matrix, and wherein the multi-dimensional matrix indicates the data associated with the one or more features in a second dimension of the multi-dimensional matrix.

3. The system of claim 1, wherein the executable instructions that cause the at least one processing device to transmit the second request for the data comprising the one or more desired features to the database further cause the processing device to:
    receive, by the database, the second request for the data;
    determine, by the database, that the database does not comprise the requested data;
    transmit, by the database to a collection device, a first communication that indicates that the database does not comprise the requested data;
    in response to receiving the first communication, collect, by the collection device, data from an external data resource;
    transmit, by the collection device to the database, the collected data;
    update, based on the collected data, the database;
    determine, by the database, that the collected data comprises the requested data; and
    transmit, to the cache device via a messaging device, the requested data.

4. The system of claim 1, wherein the executable instructions that cause the at least one processing device to transmit the requested data further cause the processing device to:
    determine, based on one or more pointers associated with the feature catalog, one or more locations of the requested data within memory associated with the cache device;
    retrieve, based the one or more locations of the requested data within the memory, the requested data from the memory; and
    transmit the retrieved data to the computing device.

5. The system of claim 1, wherein the executable instructions that cause the at least one processing device to transmit the second request for the data comprising the one or more desired features to the database further cause the processing device to:
    receive, by the database, the second request for the data;
    determine, by the database, that the database comprises the requested data;
    transmit, by the database to a messaging device, a communication that indicates the requested data; and
    receive, by the cache device from the messaging device, the requested data.

6. The system of claim 1, wherein the executable instructions that cause the at least one processing device to transmit the second request for the data comprising the one or more desired features to the database further cause the processing device to:
    receive, by the database, the second request for the data;
    determine, by the database, that the database does not comprise the requested data;
    transmit, by the database to a messaging device, a first communication that indicates that the database does not comprise the requested data;
    receive, by the cache device from the messaging device, a second communication that indicates that the database does not comprise the requested data; and
    in response to receiving the second communication, transmit, to the computing device, a third communication that indicates that the requested data could not be determined.

7. A computer program product for processing data analytics within memory, the computer program product comprising a non-transitory computer-readable storage medium having computer-executable instructions for causing one or more processing devices to:

receive, from a computing device by a cache device, a first request for data associated with a database, wherein the first request indicates one or more desired features of the data;

search a feature catalog for the data that comprises the one or more desired features, wherein the feature catalog comprises data features associated with a plurality of requests that were previously processed, wherein each of the plurality of requests comprises respective one or more desired features of the data;

determine, based on the search of the feature catalog, whether the feature catalog comprises the requested data, wherein the feature catalog is updated in real-time utilizing a deep learning neural network comprising a plurality of Long Short-Term Memory (LSTM) cells configured to update the feature catalog based on a respective relevancy of the respective one or more desired features of the data;

if the feature catalog comprises the requested data, transmit the requested data to the computing device; and if the feature catalog does not comprise the requested data, transmit a second request for the data comprising the one or more desired features to the database, wherein the deep learning neural network comprises a multi-layer neural network, wherein each of the plurality of LSTM cells comprises at least one of a forget gate, an input gate, a vector gate and an output gate, and wherein each of the plurality of LSTM cells outputs a respective weighted output that indicates a relevancy of a data input based on the one or more desired features.

8. The computer program product of claim 7, wherein the feature catalog comprises a multi-dimensional matrix that indicates the one or more features in a first dimension of the multi-dimensional matrix, and wherein the multi-dimensional matrix indicates the data associated with the one or more features in a second dimension of the multi-dimensional matrix.

9. The computer program product of claim 7, wherein the computer-executable instructions to transmit the second request for the data comprising the one or more desired features to the database further comprises computer-executable instructions to cause one or more processing devices to:

receive, by the database, the second request for the data;
determine, by the database, that the database does not comprise the requested data;
transmit, by the database to a collection device, a first communication that indicates that the database does not comprise the requested data;
in response to receiving the first communication, collect, by the collection device, data from an external data resource;
transmit, by the collection device to the database, the collected data;
update, based on the collected data, the database;
determine, by the database, that the collected data comprises the requested data; and
transmit, to the cache device via a messaging device, the requested data.

10. The computer program product of claim 7, wherein the computer-executable instructions to transmit the requested data further comprises computer-executable instructions to cause one or more processing devices to:

determine, based on one or more pointers associated with the feature catalog, one or more locations of the requested data within memory associated with the cache device;
retrieve, based the one or more locations of the requested data within the memory, the requested data from the memory; and
transmit the retrieved data to the computing device.

11. The computer program product of claim 7, wherein the computer-executable instructions to transmit the second request for the data comprising the one or more desired features to the database further comprises computer-executable instructions to cause one or more processing devices to:

receive, by the database, the second request for the data;
determine, by the database, that the database comprises the requested data;
transmit, by the database to a messaging device, a communication that indicates the requested data; and
receive, by the cache device from the messaging device, the requested data.

12. The computer program product of claim 7, wherein the computer-executable instructions to transmit the second request for the data comprising the one or more desired features to the database further comprises computer-executable instructions to cause one or more processing devices to:

receive, by the database, the second request for the data;
determine, by the database, that the database does not comprise the requested data;
transmit, by the database to a messaging device, a first communication that indicates that the database does not comprise the requested data;
receive, by the cache device from the messaging device, a second communication that indicates that the database does not comprise the requested data; and
in response to receiving the second communication, transmit, to the computing device, a third communication that indicates that the requested data could not be determined.

13. A computerized method for processing data analytics within memory, the computerized method comprising:

receiving, from a computing device by a cache device, a first request for data associated with a database, wherein the first request indicates one or more desired features of the data;

searching a feature catalog for the data that comprises the one or more desired features, wherein the feature catalog comprises data features associated with a plurality of requests that were previously processed, wherein each of the plurality of requests comprises respective one or more desired features of the data;

determining, based on the search of the feature catalog, whether the feature catalog comprises the requested data, wherein the feature catalog is updated in real-time utilizing a deep learning neural network comprising a plurality of Long Short-Term Memory (LSTM) cells configured to update the feature catalog based on a respective relevancy of the respective one or more desired features of the data;

if the feature catalog comprises the requested data, transmitting the requested data to the computing device; and if the feature catalog does not comprise the requested data, transmitting a second request for the data comprising the one or more desired features to the database, wherein the deep learning neural network comprises a multi-layer neural network, wherein each of the plurality of LSTM cells comprises at least one of a forget gate, an input gate, a vector gate and an output gate, and wherein each of the plurality of LSTM cells outputs a respective weighted output that indicates a relevancy of a data input based on the one or more desired features.

14. The computerized method of claim 13, wherein the feature catalog comprises a multi-dimensional matrix that indicates the one or more features in a first dimension of the multi-dimensional matrix, and wherein the multi-dimensional matrix indicates the data associated with the one or more features in a second dimension of the multi-dimensional matrix.

15. The computerized method of claim 13, wherein transmitting the second request for the data comprising the one or more desired features to the database further comprises:
   receiving, by the database, the second request for the data;
   determining, by the database, that the database does not comprise the requested data;
   transmitting, by the database to a collection device, a first communication that indicates that the database does not comprise the requested data;
   in response to receiving the first communication, collecting, by the collection device, data from an external data resource;
   transmitting, by the collection device to the database, the collected data;
   updating, based on the collected data, the database;
   determining, by the database, that the collected data comprises the requested data; and
   transmitting, to the cache device via a messaging device, the requested data.

16. The computerized method of claim 13, wherein transmitting the requested data further comprises:
   determining, based on one or more pointers associated with the feature catalog; one or more locations of the requested data within memory associated with the cache device;
   retrieving, based the one or more locations of the requested data within the memory, the requested data from the memory; and
   transmitting the retrieved data to the computing device.

17. The computerized method of claim 13, wherein transmitting the second request for the data comprising the one or more desired features to the database further comprises:
   receiving, by the database, the second request for the data;
   determining, by the database, that the database comprises the requested data;
   transmitting, by the database to a messaging device, a communication that indicates the requested data; and
   receiving, by the cache device from the messaging device, the requested data.

18. The computerized method of claim 13, wherein transmitting the second request for the data comprising the one or more desired features to the database further comprises:
   receiving, by the database, the second request for the data;
   determining, by the database, that the database does not comprise the requested data;
   transmitting, by the database to a messaging device, a first communication that indicates that the database does not comprise the requested data;
   receiving, by the cache device from the messaging device, a second communication that indicates that the database does not comprise the requested data; and
   in response to receiving the second communication, transmitting, to the computing device, a third communication that indicates that the requested data could not be determined.

* * * * *